(12) United States Patent  
Bar-On

(10) Patent No.: US 7,082,315 B2
(45) Date of Patent: Jul. 25, 2006

(54) MOBILE STATION AND METHOD OF USE IN RADIO COMMUNICATIONS

(75) Inventor: David Bar-On, Rehovot (IL)

(73) Assignee: Motorola, Inc., Schaumburg, IL (US)

( * ) Notice: Subject to any disclaimer, the term of this patent is extended or adjusted under 35 U.S.C. 154(b) by 481 days.

(21) Appl. No.: 10/399,877

(22) PCT Filed: Oct. 18, 2001

(86) PCT No.: PCT/EP01/12051

§ 371 (c)(1),
(2), (4) Date: Apr. 23, 2003

(87) PCT Pub. No.: WO02/37885

PCT Pub. Date: May 10, 2002

(65) Prior Publication Data

US 2004/0102204 A1 May 27, 2004

(30) Foreign Application Priority Data

Oct. 23, 2000 (GB) ................................. 0025917.6

(51) Int. Cl.
*H04B 7/00* (2006.01)
(52) U.S. Cl. ..................................... 455/518; 455/519
(58) Field of Classification Search ................ 455/456, 455/518, 519, 520, 521, 522
See application file for complete search history.

(56) References Cited

U.S. PATENT DOCUMENTS 6,240,069 B1 * 5/2001 Alperovich et al. ........ 370/260
6,477,150 B1 * 11/2002 Maggenti et al. ........... 370/312

FOREIGN PATENT DOCUMENTS

GB 2368493 A 5/2002

* cited by examiner

*Primary Examiner*—Edward F. Urban
*Assistant Examiner*—Tu X. Nguyen
(74) *Attorney, Agent, or Firm*—Indira Saladi; Terri S. Hughes

(57) ABSTRACT

A method for setting up a group call within a dispatch radio communication system is disclosed. Additional stations which are not programmed to respond to a transmitted group identification code (GIC) are enabled to join the call. The method comprises steps carried out by a service provider of (a) providing first and second additional fields in a set-up message, the first additional field carrying a Group Call Access Permission (GCAP) value and the second additional field carrying a Help Request Level (HRL) value, (b) enabling a call initiator to select a GCAP value, according to a range of stations the call initiator wishes to reach, and a HRL value, according to an assigned call priority, for transmission alongside the GIC in the step (a) fields, and (c) enabling any station that receives a set-up message to determine whether to join the call based on the GCAP and HRL values.

19 Claims, 2 Drawing Sheets

| GROUP ID | GCAP (ACCESS PERMISSION) | DID (DISTRIBUTION ID) | HRL (HELP REQUEST LEVEL) |
|---|---|---|---|
*FIG. 1*
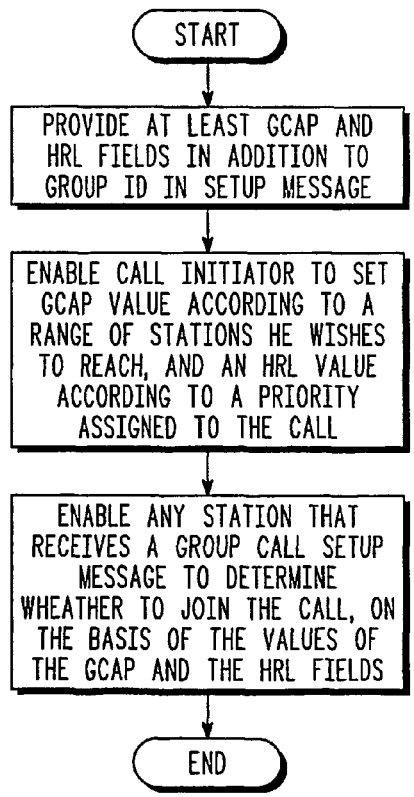
*FIG. 2*
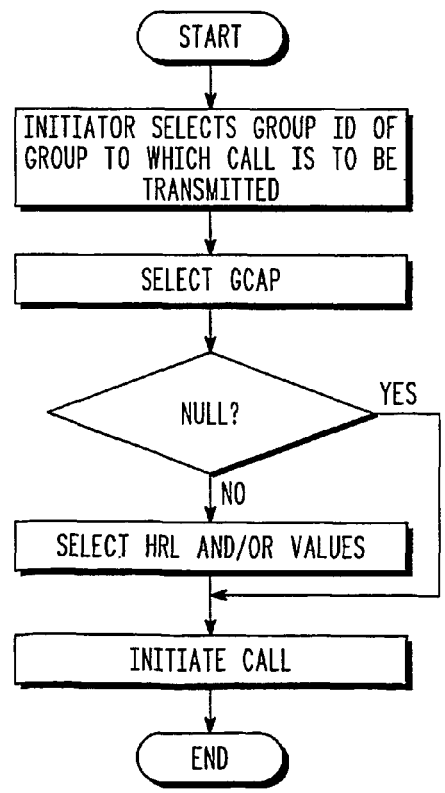
*FIG. 3*

MOBILE STATION AND METHOD OF USE
IN RADIO COMMUNICATIONS

This application claims the benefit of prior filed co-pending international application Ser. No. PCT/EP01/12051 filed Oct. 18, 2001, and assigned to Motorola, Inc., which was published by the International Bureau on May 10, 2002 under No. WO 02/37885 A1.

FIELD OF THE INVENTION

This invention relates to a mobile station and a method for use in radio communications. In particular, it relates to a mobile station that is operable to make group calls with other mobile stations and to a method of arranging such calls.

BACKGROUND OF THE INVENTION

Mobile radios or radio transceivers are also known in the art and referred to herein as mobile stations (MSs). The terms 'radio', 'mobile radio transceiver' and 'mobile station (MS)' are intended to include within their meaning mobile and portable telephones and mobile and portable radio communications units and the like. Systems which include MSs and other units for radio communication with them are referred to herein as mobile radio communications systems.

Mobile radio communication systems may allow any user of the system to establish communication with one or more other users immediately after setting up (i.e. initiating) a call. Such systems generally operate in one of two modes— Direct Mode of Operation (DMO), where there is a direct radio link between mobile stations, and Trunked Mode of Operation (TMO), where the mobile stations are in radio communication via one or more interconnected base stations which are usually deployed in a cellular fashion, the system being actively managed by a system control station. Any particular mobile station may be designed to operate in DMO or TMO or both (in the case of both by switching between these modes). Examples of current commercial systems which provide operation in such modes are known. Systems and mobile stations which operate according to TETRA (Terrestrial Trunked Radio) standards defined by the European Telecommunications Institute (ETSI) are examples.

Communication between a calling mobile station and one or more called mobile stations is implemented in DMO by allocating to the stations a common channel. In TMO this is done by allocating a common channel in each base station. The term "channel" here has its usual meaning in relation to radio communication, such as a carrier frequency (in frequency division multiple access or FDMA systems) and/or a time slot (in time division multiple access or TDMA systems) or a code (in code division multiple access or CDMA). In TMO, there always is one channel, called a "control channel", over which call initiation signals and identification codes, inter alia, are sent. In DMO, the common channel allocated, is normally used as the control channel, when no call is active.

In many mobile radio communication systems, of both the DMO and TMO types, it is possible to set up a group call between mobile stations of multiple users in a group. The group call is usually implemented by allowing the users to share a channel; sometimes it is also implemented over duplex channels, e.g. in DMO through the use of repeater stations. The system and the over-the-air protocol then support a mechanism to synchronise the channel access between the group members. A group call is arranged by generating a group call set-up request signal in the mobile station of a user wishing to initiate the call and transmitting the signal to the mobile stations of the other group members. This may be actioned in DMO, for example, by the initiator pushing a certain button or key on his/her mobile station, to operate a programmed initiation function in a so-called 'push-to-talk' (PTT) or despatch procedure. An appropriate set-up request signal is sent from the mobile station of the initiator over the appropriate control channel. All contactable mobile stations that belong to the called group can thereby pick up the call request and respond, e.g. by automatically joining the call. If a particular mobile station in the group is busy at the time, it may be operable to join the call automatically as soon as it becomes free, by periodic broadcast of a "Late entry" signal.

Normally, within any mobile communications system, one or more groups of mobile stations may be predefined whereby each mobile station belonging to a given group is allowed to have access and join a group call between members of that group. This can be done for example by pre-programming the mobile stations to recognise the group identity, usually by use of a group identity (ID) code or number. Pre-programming a mobile station involves storing therein the ID code of the particular group(s) to which it belongs.

When a group call set-up request signal is initiated over a channel assigned to the group, a corresponding group ID code is transmitted as part of the signal. The group code is entered by the user that is the call initiator. All mobile stations receiving the transmission that have stored this ID code (and thus belong to that group) can detect a match with the stored code and can respond by automatically joining the call or by indicating to the user that a request has been received to join the call.

In current mobile communication systems, access to a group call is generally limited to predefined groups of users identified by their group ID code, as described above. The present inventors have recognised however that such an arrangement can have limitations which in some circumstances can be serious, for the reasons explained later.

SUMMARY OF THE INVENTION

According to the present invention in a first aspect there is provided a mobile station for use in radio communications with other mobile stations the mobile station being operable to establish a group call with one or more of the other mobile stations by issuing a signal indicating which other mobile stations are requested or permitted to join the group call, wherein the mobile station includes input selection means for allowing a user of the mobile station to select one or more options from one or more call set-up criteria options available to the user and which is operable to issue a call set-up request signal including a plurality of fields relating to the requested call, wherein a first one of the fields relates to a group permitted or requested to join the call, and wherein a second one of the fields relates to an option related to the requested call selectable by the user using the input selection means.

In this specification, 'call' refers to a radio communication. The communication may in many cases be to transfer information representing speech, although it could be used to transfer other information, e.g. numerical or text data or signals representing pictures, e.g. video signals.

The first one of the fields may indicate a group identity code or number which in operation of the mobile station is input separately from the input selection means. Such a group identity number or code is conventional and may be input in a known manner, e.g. by the user by entry of the digits of the required number or code, e.g. via a keyboard. In contrast, the input selection means may conveniently allow the user to select an available option by a single selection command, e.g. by use of a button or key.

The input selection means may be operable to select one or more options from a plurality of group selection criteria options each defining a selectable group to be requested or permitted to join the call whereby a group call set-up request signal is issued to all of the contactable mobile stations in each group selected, whereby at least two of the plurality of fields of the said signal relate to different groups permitted or requested to join the call. Examples of such groups which may be included in an option are given later.

The mobile station according to the first aspect of the invention may be operable whereby the said second field indicates whether or not the option related thereto has been selected. The said second field may relate to an option which is selectable by a user from a plurality of options and the mobile station may be operable whereby the said second field indicates which one of the plurality of options has been selected by a user.

In operation of a mobile station according to the invention a selectable option may define selection of a group of mobile stations of members of an organisation or part of an organisation, e.g. the employing organisation of the users. For example, the group of mobile stations selectable may be of members of the organisation who are in a given region or in a given department or branch of the organisation.

Alternatively, or in addition, a selectable option may define selection of a group which includes all mobile stations that can be contacted in a given region.

Alternatively, or in addition, a selectable option may relate to a priority level of a call to be established and wherein the mobile station is operable to issue a group call set-up request signal including a field indicating a priority level of the group call set-up request. The said selectable option may relate to one of a plurality of selectable priority levels of a call to be established and the mobile station may be operable to issue a group call set-up request signal including a field indicating which of the priority levels of the group call set-up request has been selected.

In operation of the mobile station according to the first aspect of the invention one or more of the options which may be selected by a user by the input selection means may conveniently be indicated to the user by an option or group descriptor or code, e.g. 'your organisation' or 'all mobiles'. The options may be presented as a series of menus from which one option is to be selected. The mobile station preferably includes a display operable to indicate to the user the one or more selectable options or menus of options available. The display may for example be operable to indicate to the user a plurality of options of selectable groups and optionally a plurality of message priority levels which may be selected by the user by the input selection means for inclusion in a group call set-up request signal.

The mobile station according to the first aspect of the invention may be operable to receive via one or more buttons or keys an input selection of a user regarding an option selected by a user to be indicated in a call set-up request signal.

The purpose of the fields of the call set-up request signal is to provide information to receiving mobile stations about the call set-up request. In some uses of the transmitting mobile station only the first field will be relevant and receiving mobile stations which recognise that they are members of a called group by inclusion of the group ID code in the set-up request, will in a known manner be able to be set to join the call or to indicate to a user that the call set-up request has been received. In other uses, however, the information contained in the second field and in any other additional fields included in the signal may indicate that another, e.g. special, option has been selected by the user of the transmitting mobile station and the receiving mobile station will be able to interpret and act upon the information accordingly. For example, the additional information may indicate selection of a larger group, e.g. all members of an organisation or all mobile stations in a given region, and optionally a priority level associated with the call set-up request. The receiving station will be programmed to be able to recognise the additional information A mobile station according to the first aspect of the invention may be operable as a receiving mobile station to receive an incoming signal from a transmitting mobile station requesting set-up of a group call with one or more other mobile stations the signal indicating the identity of mobile stations that are permitted to join the group call, wherein the received signal includes a plurality of fields at least one of which relates to an option selectable by the user of the transmitting mobile station and the receiving mobile station is operable to determine from the fields whether it is permitted or requested to join the group call. The receiving mobile station may be operable whereby one or more of the fields of the received signal is recognised by the receiving mobile station to relate to a group of mobile stations defined by an option selectable by the user of the transmitting mobile station.

One of the fields of the received signal may relate to a priority level of the group call set-up request selectable as an option by the user of the transmitting mobile station. The receiving mobile station may be operable in a manner such that upon determining that it is permitted to join the group call, and optionally that a priority level of the call set-up request is at or above a pre-determined priority level, the receiving mobile station is operable automatically to be set to a state in which it participates in the requested group call.

Alternatively, the receiving mobile station may be operable in a manner such that upon determining that it is permitted to join the group call, and optionally that a priority level of the call set-up request is at or above a pre-determined priority level, the mobile station produces an indication to its user of the call set-up request. The indication of the call set-up request to the user may be provided on a display, which may be the same display used for displaying options relating to call set-up when the mobile station is acting as a transmitting station. The mobile station as receiving mobile station may be operable to receive from a user a control input by which the mobile station is set to a state in which it participates in the requested group call upon receiving a control input signal from the user. The control input signal may be provided by the user in a known manner, e.g. using a button or a hard or soft key.

The mobile station according to the first aspect of the invention may be operable, as in the prior art, to produce and/or receive a group call set-up request signal on a common channel with other mobile stations using a protocol which supports synchronising the channel access between members of a selected group.

A particular form of the mobile station according to the first aspect of the invention includes:

a processor, a memory coupled to the processor and storing therein an instruction set, a transmitter and a receiver both coupled to the processor and being adapted to operate in accordance with a communications protocol using Group Call Access Permission (GCAP) and Help Request Level (HRL) fields stored in the memory, a user interface including a display coupled to the processor and responsive to the instruction set stored in the memory for selecting, setting and displaying the GCAP and HRL fields, a GCAP extractor and an HRL extractor for extracting values of GCAP and HRL fields of an incoming message, and respective comparators coupled to the GCAP extractor and to the HRL extractor for comparing the values of the respective fields extracted thereby with values stored in the memory;

said processor being responsive to respective outputs of the comparators for determining whether to join an incoming call.

The mobile station having the particular form may further include:

a DID (Distribution Identity) field value stored in the memory in respect of said communications protocol and being selectable and capable of display using the user interface, a DID extractor for extracting the value of the DID of an incoming message, and a comparator coupled to the DID extractor for comparing the value of the respective fields extracted thereby with values stored in the memory;

said processor being further responsive to the output of the DID comparator for determining whether to join an incoming call.

The mobile station according to the first aspect of the invention may be operable to establish a group call in a direct mode of operation (DMO). Alternatively, or in addition (as a different option), the mobile station may be operable to establish a group call in a trunked (TMO) mode of operation. Where the mobile station is operable in DMO, a call set-up may be initiated by a known push-to-talk (PTT) procedure in which the mobile station begins setting up a call request by pushing of a PTT button or the like by a user.

The mobile station according to the first aspect of the invention and the system in which it operates, including other mobile stations, may be operable according to TETRA standard procedures.

According to the present invention in a second aspect there is provided a method for setting up a group call within a communication system providing radio communication among a plurality of mobile stations each being a mobile station according to the first aspect, by a call initiating mobile station issuing a call set-up signal indicating which other mobile stations are requested or permitted to join the group call, wherein the user of the initiating mobile station selects one or more options from one or more call set-up criteria options available to the user and the initiating mobile station issues a call set-up request signal including a plurality of fields relating to the requested call, wherein a first one of the fields relates to a group permitted or requested to join the call, and wherein a second one of the fields relates to an option related to the requested call which option has been selected by the user using the input selection means of the initiating mobile station.

According to a particular form of the method according to the second aspect of the invention there is provided a method for setting up a group call within a communication system providing radio communication among a plurality of mobile stations each being a mobile station according to the first aspect, using a broadcast set-up signal that includes a group identification code (GIC), whereby additional mobile stations, which are not automatically programmed to respond to the transmitted GIC, are enabled to join the call, the method comprising the steps of:

(a) providing at least first and second additional fields in the call request set-up signal, the first additional field carrying a Group Call Access Permission (GCAP) value and the second additional field carrying a Help Request Level (HRL) value;

(b) enabling a call initiator to select a GCAP value, according to a range of stations he/she wishes to reach, and a HRL value, according to a priority assigned to the call, for transmission alongside the group identification code in the respective fields of step (a); and (c) enabling any mobile station that receives a group call set-up request message to determine whether to join the call, on the basis of the values of the GCAP and the HRL fields.

In step (c) of the said particular form of the method according to the second aspect, the receiving station may also have one or more Response Priority Level (RPL) values stored, each value corresponding to one or more combinations of HRL and GCAP values, and said determination includes comparing the received HRL value with the stored RPL value that corresponds to the received GCAP values.

The particular form of the method according to the second aspect of the invention may further comprise the step of the receiving mobile station automatically joining the call, dependent on the result of said comparing.

The method according to the second aspect of the invention may further comprise the step of displaying by the receiving mobile station any field value included in the received call set-up request signal. In particular, there may be displayed any value contained in a group of field values that includes the received GCAP, the received HRL, the corresponding RPL and the result of said comparing.

In step (c) of the particular form of the method according to the second aspect, the receiving station may also has one or more pairs of Response Priority Level (RPL) values stored, each pair corresponding to one or more combinations of HRL and GCAP values, and said determination includes comparing the received HRL value with a first value of the stored RPL value that corresponds to the received GCAP value, said method further comprising the step of:

enabling any mobile station that receives a group call set-up message to notify its user about such reception, if the received HRL value equals or exceeds the second value of said stored RPL pair of values, and to join the call according to the response of the user.

In the particular form of the method according to the second aspect of the invention, the call set-up request signal may also usefully include an organisation identification of the initiating mobile station and whereby in step (c) the determining may include comparing the received organisation identification with an organisation identification stored by the receiving mobile station.

Step (a) of the particular form of the method according to the second aspect of the invention may include providing a third additional field carrying a Distribution Identification (DID) value, corresponding to the organizational identification of the initiating station, and in step said determining includes comparing the received DID with an organizational identification stored in said station.

A version of the particular form of the method according to the second aspect may comprise a method for setting up a group call within a dispatch mobile radio communication system, using a broadcast set-up message that includes a group identification code (GIC), whereby additional mobile stations, which are not programmed to respond to the transmitted GIC, are enabled to join the call, the method comprising the following steps, all carried out as operations of a mobile station by a call initiator:

(1) selecting a Group Call Access Permission (GCAP) value, according to a range of receiving mobile stations the call initiator wishes to reach, and a Help Request Level (HRL) value, according to a priority assigned to the call, (2) transmitting a group call set-up request signal including a group identification code and at least a first additional field carrying said Group Call Access Permission (GCAP) value and a second additional field carrying said Help Request Level (HRL) value; and (3) receiving at a receiving mobile station a group call set-up request signal having GCAP and HRL fields and determining whether to allow the receiving station to join the call, on the basis of the values of the GCAP and the HRL fields.

The particular form of the method according to the second aspect of the present invention may thus be carried out by the following exemplary, but not limiting, arrangements. In the group call set-up signal format there may be provided three additional fields (additional to the conventional one indicating the ID of a called group). These may include a Group Call Access Permission (GCAP), a Distribution ID (DID) and a Help Request Level (HRL). The GCAP indicates the group call as being of the permissible access type and may define within the user's organisation the extent of the permission, e.g. "all" or "department". The DID carries the identity of the organizational extent of the permission, for example the department, if this is the level of extent. The HRL carries the priority value assigned to the call by the caller. These fields are broadcast over the control channel as part of the call set-up request signal, along with the ID of the group being directly addressed.

Every mobile station belonging to the addressed group may in such arrangements, respond, in a usual manner. However, if in addition the value of GCAP is not "null", any mobile station that belongs to the organisation sector defined by GCAP and DID may optionally respond. Its decision to respond is based on some selectable criteria, which may primarily relate to the value of the received HRL. The criteria upon which the receiving mobile station makes its decisions based upon the received values may have been pre-programmed, so that the decision to respond is automatic. Alternatively, the values may be presented to the user for his/her decision.

By the invention, the group to which a call set-up signal is sent by an initiating mobile station may be optionally broadened, so as to permit mobile stations that do not normally belong to a group being addressed optionally to join a current group call. This optional broadening can be beneficial in various circumstances. For example, the invention allows a user when on a temporary job assignment away from his/her usual work location, to call a group normally associated with the job or its territory. Another example of beneficial use of the invention is an operational emergency situation, where different, mutually unassociated, forces should join together, the invention allowing a larger group of users to be contacted readily.

A known method (only in TMO) of dealing with such an emergency situation is to set up a group call ad hoc, i.e. without predefining the group users, which may be used in such a situation, by initiating a series of 'Include Calls', whereby certain individual mobile stations are addressed and made to form a group. This, however, is a tedious process and not applicable when the IDs of the particular mobile stations are unknown. In any event, this method is not possible in DMO systems, where no central controller is available. Also it is known to be possible to merge groups to form a so called 'supergroup', but the identities of the groups still have to be pre-defined. The invention in contrast is beneficial in that it allows formation of wider groups in a procedure which to the user is simple, without knowledge of any particular group or individual mobile station ID number.

Yet another example of a situation in which use of the invention is beneficial is an individual emergency situation in which a user may find himself/herself in distress and would like to address all, or some of, the nearby mobile stations (which generally do not belong to any defined group). In such a situation, he/she may want to address "all", contactable stations, e.g. all stations detected in a known manner to be in a given region.

Thus, the inventors have demonstrated, within a mobile communication system, a facility beneficially allowing a mobile station user to establish ad hoc communication with a group of users that has not previously been defined, e.g. does not have a predefined group ID code, and for which the individual identities of the users may not even be known to the initiator, although they may be part of a formally defined group, e.g. members of the same organisation or sub-organisation, which the mobile stations involved can recognise by information in the appropriate signal field(s) and stored by them. It is to be noted that any user whose mobile station receives and recognises a call set-up request signal can disregard the signal (with some mobile stations) or even disconnect the mobile station from the set-up, if and when he/she decides that the call is of no interest.

Embodiments of the present invention will be described by way of example with reference to the accompanying drawings, in which:

BRIEF DESCRIPTION OF THE DRAWINGS

FIG. 1 shows a preferred data structure required for setting up group calls according to the present invention;

FIG. 2 shows the principal operating steps carried out by a service provider according to the invention;

FIG. 3 shows the principal operating steps carried out by a radio when initiating a call according to the invention;

DETAILED DESCRIPTION OF EMBODIMENTS OF THE INVENTION

Figure 4:
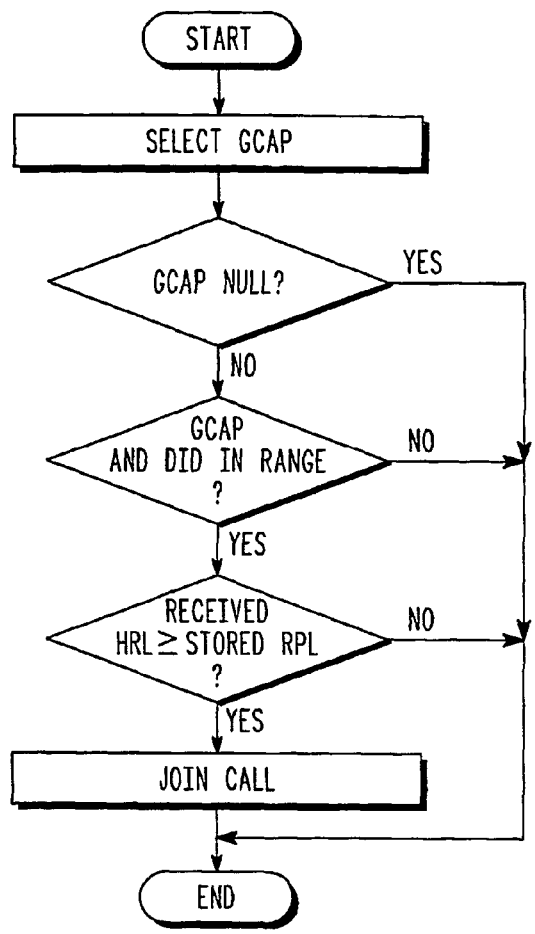
FIG. 4 shows the principal operating steps carried out by a radio when responding to a call according to the invention.

With reference to FIG. 1 there is shown schematically a protocol for setting up a group call modified to include a class of group calls, to be referred to as "Permissible Access Group Calls" (PAGC), by including at least two additional fields. Thus, for example, a Group Call set-up message, as well as late entry message, may include, in addition to the group ID code, three new fields—a Group Call Access Permission (GCAP), a Distribution ID (DID) and a Help Request Level (HRL).

The GCAP field identifies the call as a PAGC and conveys the distribution level for the permissible access. It can contain any value from a predefined list of values, in addition to the null value. The null value (for example, 0) signifies that this is not a PAGC, but rather a normal group call, so that only radios programmed to join the group identified in the Group ID field may (and will) do so, as in present systems. In this case the other two fields have no role and are ignored. Other values in the list may, for example, be:

1—The caller's fleet
2—The caller's organization
3—All users (all users that are reachable by the originator)

In this example, for GCAP=1 or 2, it is required that the DID field include the ID of the caller's fleet or organisation, respectively; consequently, the group set-up and announcement signalling will include that ID. For such distribution levels to be valid, it is required that all radios (mobile stations) in the network (or at least those that are deemed sufficiently important to have the ability of permissible access) have their respective fleet—and organisation IDs internally recorded. For GCAP=3, the DID field has no role and is ignored. For the "all" distribution level to be effective, it is required that response to an "all" code be enabled in all participating radios.

The HRL field conveys the level of urgency of the call. In the preferred embodiment it can contain any of four values:

1—Low
2—Medium
3—High
4—Extremely high (Emergency)

FIG. 2 shows the principal steps carried out to pre-programmme radios embodying the invention. Each radio is programmed to set up a PAGC according to a command by the user, whereby he/she keys in the desired values of the GCAP and HRL fields, or pushes appropriately programmed buttons. Certain values may be preset as defaults. For GCAP values such as 1 and 2 in the above example, the respective ID recorded in the caller's radio is copied into the DID field. The group ID is that chosen by the caller (e.g. through the button pushed) from among the ones he is programmed for, as in conventional systems. Alternatively, there may be defined, ad hoc or system-wide, a special group ID, to which no radio is normally programmed to respond, which will serve for the PAGC (or for PAGCs in general).

Each radio is programmed to respond to a PAGC according to the contents of the relevant fields, other than the group ID, in the set-up message: To continue the example discussed above, a radio will respond to a GCAP=3 if it is enabled to respond to "all" calls; it will respond to a GCAP=1 or 2 if its own fleet—or organization ID, respectively, is that appearing in the DID field. It is to be noted that this aspect of the response protocol is similar to that of group ID alone in the case of a normal group call. Further, however, pre-programmed codes determine whether the radio will respond to the particular combination of HRL and GCAP values, possibly also in combination with group IDs. For each GCAP (possibly in combination with particular group IDs), a parameter, called "Response Priority Level" (RPL), determines at what level of help request (i.e. at what minimum value of HRL) to respond. For example, RPL may be 4 (highest) for an "all" or "organization" call (meaning that only emergency calls within this wide network range should be answered); it may be 1 for a "fleet" call with a certain group ID (meaning that even low-priority calls from that group will be answered) and may be 2 for "fleet" calls from all other groups. Optional possibilities, involving visible and/or audible signals to the user of the station, asking for his decision, are that (a) all "no response" (HRL<RPL) cases be referred to the user, (b) all "response permitted" (HRL≧RPL) cases be referred to the user, and (c) all cases, regardless of HRL value, be referred to the user, with the HRL value displayed. As a refinement to the capability described above, the present invention also allows for a RPL to have two values (again, for each combination of GCAP and group-ID values): The first value affects automatic response, as described above; the second value, which would normally be less than the first value, affects the response in association with manual monitoring facility, as follows: Whenever the HRL is equal to, or exceeds, the second RPL value (whilst, presumably, being less than the first RPL value), a visual and/or audible message to that effect is presented to the user, whereby he is asked to decide on whether or not to respond and join the call. Such a manual monitoring facility is preferably implemented in conjunction with a caller identification facility.

Reference is now made to FIGS. 3 and 4 showing typical operation steps of a radio when initiating and answering a call, respectively. The steps are as follows:

1. The call initiator selects a group to call to.
2. He/she is given the possibility of selecting a GCAP (whereby the default is the null value).
3. Accordingly, he/she is then given the possibility of selecting the HRL and/or DID values (whereby their default values are pre-programmed as part of the radio parameters).
4. The user issues the call.
5. Any radio that receives that call, with the GCAP being non-null, refers to its own stored GCAP and DID codes, to determine whether it is within the intended distribution range of the call.
6. The receiving radio then compares the received HRL value with its stored RPL table and decides accordingly whether to join the call or possibly whether to first notify the user about the call, including its HRL.
7. According to the decision or, possibly, the user's response, the radio joins the call or ignores it.

In many practical systems, the number of different distribution ranges may be quite limited, or it may never be allowed that a PAGC be directed at a range (such as organization or fleet) outside that of the caller. For these cases there is no need for the Distribution ID (DID) field, and an alternative protocol would then provide for only two fields, in addition to the Group ID, namely the GCAP and the HRL fields.

It will be appreciated that this embodiment can be carried out in a relatively simple manner. In particular, it is generally unnecessary to reprogram group codes into the radios and all existing groupings may remain intact. The only reprogramming necessary is (a) reloading with a new software version—which adds the three fields to the message protocol and provides for user specification of their values and for the additional response modes, described above, and (b) setting of individual RPL values. The new software version may also include default values for the various parameters (both for call set-up and for response), codes enabling response to "all" calls and the ID codes of the radio's "organization", "fleet", etc. Some of the default parameter settings may be programmed into particular radios in conjunction with group IDs, so that, for example, certain group calls will be associated, by default with certain HRL values.

Such software may be downloaded from a central service provider by connecting the radio to the central service provider via a wireless or wired link. The software used in the radios embodying the invention may therefore be utilised by a suitable processing unit within the radio.

Figure 5:
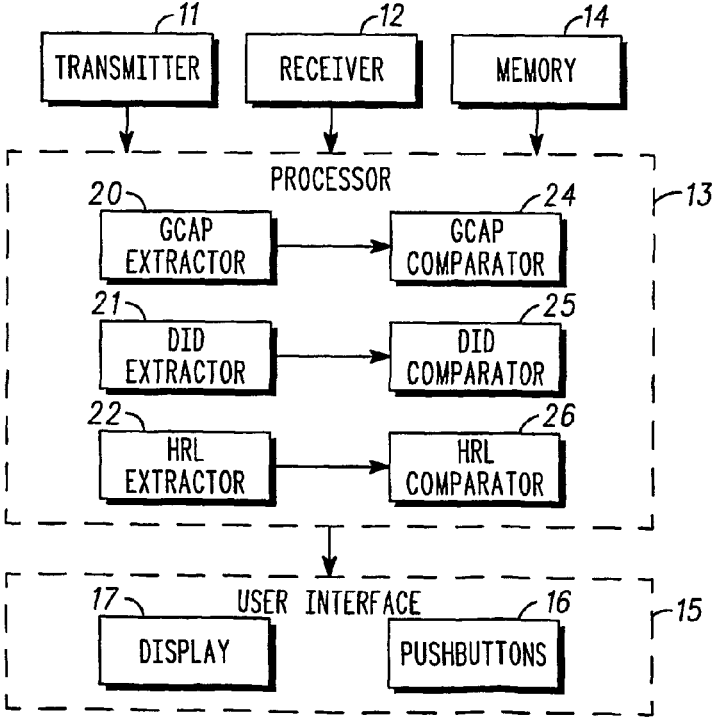
FIG. 5 shows functionally a radio according to the invention for use by a call initiator.

FIG. 5 shows functionally a radio 10 having installed therein software allowing use in accordance with an embodiment of the invention. The radio includes a transmitter 11 and a receiver 12 both coupled to a processor 13 operating in accordance with a protocol stored in a memory 14. The radio further includes a user interface 15 coupled to the processor 13 and including push buttons 16 for selecting and setting different fields of the protocol in accordance with a programmed instruction set stored in the memory 14. The user interface 15 further includes a display 17 for displaying messages and data and, together with the push buttons 16 allows an operator of the radio 10 to set the GCAP, DID and HRL fields according to the requirements explained above with particular reference to FIGS. 3 and 4 of the drawings.

The processor 13 further includes a GCAP extractor 20, a DID extractor 21 and an HRL extractor 22 for extracting the values of the GCAP, DID and HRL of an incoming message. Respective comparators 24, 25 and 26 are coupled to the GCAP extractor 20, to the DID extractor 21 and to the HRL extractor 22 for comparing the values of the respective fields extracted thereby with values stored in the memory 14 and entered by the operator or having pre-set values. These functions are typically carried out in software but may, if desired, be implemented in hardware.

The processor 13 is responsive to the outputs of the comparators 24, 25 and 26 for determining whether the radio 10 should join a received call initiated by a call initiator according to the protocol as described above with reference to FIG. 3. The manner in which such determination is effected is as described above with reference to FIG. 4.

The invention claimed is:

1. A mobile station comprising:
a processor,
a memory coupled to the processor and storing therein an instruction set,
a transmitter and a receiver both coupled to the processor and being adapted to operate in accordance with a communications protocol using Group Call Access Permission (GCAP) and Help Request Level (HRL) fields stored in the memory,
a user interface including a display coupled to the processor and responsive to the instruction set stored in the memory for selecting, setting and displaying the GCAP and HRL fields,
a GCAP extractor and an HRL extractor for extracting values of GCAP and HRL fields of an incoming message, and
respective comparators coupled to the GCAP extractor and to the HRL extractor for comparing the values of the respective fields extracted thereby with values stored in the memory;
said processor being responsive to respective outputs of the comparators for determining whether to join an incoming call.

2. A mobile station according to claim 1 further comprising:
a DID (Distribution Identity) field value stored in the memory in respect of said communications protocol and being selectable and capable of display using the user interface,
a DID extractor for extracting the value of the DID of an incoming message, and
a comparator coupled to the DID extractor for comparing the value of the respective fields extracted thereby with values stored in the memory;
said processor being further responsive to the output of the DID comparator for determining whether to join an incoming call.

3. A method for setting up a group call within a dispatch radio communication system, using a broadcast set-up message that includes a group identification code (GIC), whereby additional stations, which are not programmed to respond to the transmitted GIC, are enabled to join the call, the method comprising the steps, all carried out by a service provider:
(a) providing at least first and second additional fields in the set-up message, the first additional field carrying a Group Call Access Permission (GCAP) value and the second additional field carrying a Help Request Level (HRL) value,
(b) enabling a call initiator to select a GCAP value, according to a range of stations he wishes to reach, and a HRL value, according to a priority assigned to the call, for transmission alongside the group identification code in the respective fields of step (a), and
(c) enabling any station that receives a group call set-up message to determine whether to join the call, on the basis of the values of the GCAP and the HRL fields.

4. A method according to claim 3, wherein in step (c) the station also has one or more Response Priority Level (RPL) values stored, each value corresponding to one or more combinations of HRL and GCAP values, and said determination includes comparing the received HRL value with the stored RPL value that corresponds to the received GCAP values.

5. A method according to claim 4 further comprising the step of automatically joining the call, dependent on the result of said comparing.

6. A method according to claim 4 further comprising the step of displaying any value selected from a group of field values that includes the received GCAP, the received HRL, the corresponding RPL and the result of said step of comparing.

7. A method according to claim 3 wherein in step (c) said station also has one or more pairs of Response Priority Level (RPL) values stored, each pair corresponding to one or more combinations of HRL and GCAP values, and said determination includes comparing the received HRL value with a first value of the stored RPL value that corresponds to the received GCAP value, said method further comprising the step of: enabling any station that receives a group call set-up message to notify its user about such reception, if the received HRL value equals or exceeds the second value of said stored RPL pair of values, and to join the call according to the response of the user.

8. A method according to claim 3 wherein the broadcast set-up massage also includes an organisation identification of the calling mobile station, and whereby in step (c) said determining includes comparing the received organizational identification with an organisation identification stored in said station.

9. A method according to claim 3 wherein step (a) comprises providing a third additional field carrying a Distribution Identification (DID) value, corresponding to the organizational identification of the initiating station, and in step (c) said determining includes comparing the received DID with an organizational identification stored in said station.

10. A method for setting up a group call within a dispatch radio communication system, using a broadcast set-up message that includes a group identification code (GIC), whereby additional stations, which are not programmed to respond to the transmitted GIC, are enabled to join the call, the method a comprising the steps, all carried out by a call initiator:

(1) selecting a Group Call Access Permission (GCAP) value, according to a range of receiving stations the call initiator wishes to reach, and a Help Request Level (HRL) value, according to a priority assigned to the call, (2) transmitting a set-up message including the group identification code and at least a first additional field carrying said Group Call Access Permission (GCAP) value and a second additional field carrying said Help Request Level (HRL) value, and (3) receiving from a responding station a group call set-up message having GCAP and HRL fields and determining whether to allow the responding station to join the call, on the basis of the values of the GCAP and the HRL fields.

11. A method according to claim 10 wherein in step (c) the responding station also has one or more Response Priority Level (RPL) values stored, each value corresponding to one or more combinations of HRL and GCAP values, and said determining comprises comparing the received HRL value with the stored RPL value that corresponds to the received GCAP values.

12. A method according to claim further comprising the step of automatically joining the responding station to the call, dependent on the result of said comparing.

13. A method according to claim 11 further comprising the step of displaying any value selected from a group of field values that comprises the received GCAP, the received HRL, the corresponding RPL and the result of said step of comparing.

14. A method according to claim 10 wherein the broadcast set-up message also includes an organisation identification of the calling mobile station, and whereby in step (c) said determining includes comparing the received organizational identification with an organisation identification stored in said station.

15. A method according to claim 10 wherein the setup message comprises a third additional field carrying a Distribution Identification (DID) value, corresponding to the organizational identification of the initiating station, and in step (c) said determining comprises comparing the received DID with an organizational identification of the call initiator.

16. A program storage device readable by machine, embodying a program of instructions executable by the machine to perform method steps for setting up a group call within a dispatch radio communication system, using a broadcast setup message that includes a group identification code (GIC), whereby additional stations, which are not programmed to respond to the transmitted GIC, are enabled to join the call, the method comprising the steps:

(a) providing at least fast and second additional fields in the setup message, the first additional field carrying a Group Call Access Permission (GCAP) value and the second additional field carrying a Help Request Level (HRL) value, (b) enabling a call initiator to select a GCAP value, according to stations he wishes to reach, and a HRL value, according to a priority assigned to the call, for transmission alongside the group identification code in the respective fields of step (a), and (c) enabling any station that receives a group call setup message to determine whether to join the call, on the basis of the values of the GCAP and the HRL fields.

17. A computer program product comprising a computer useable medium having computer readable program code embodied therein for setting up a group call within a dispatch radio communication system, using a broadcast setup message that includes a group identification code (GIC), whereby additional stations, which are not programmed to respond to the transmitted GIC, are enabled to join the call, the computer program product comprising:

computer readable program code for causing the computer to provide at least first and second additional fields in the setup message, the first additional field carrying a Group Call Access Permission (GCAP) value and the second additional field carrying a Help Request Level (HRL) value, computer readable program code for causing the computer to enable a call initiator to select a GCAP value, according to stations he wishes to reach, and a HRL value, according to a priority assigned to the call, for transmission alongside the group identification code in the respective fields of step (a), and computer readable program code for causing the computer to enable any station that receives a group call setup message to determine whether to join the call, on the basis of the values of the GCAP and the HRL fields.

18. A program storage device readable by machine, embodying a program of instructions executable by the machine to perform method steps for setting up a group call within a dispatch radio communication system, using a broadcast setup message that includes a group identification code (GIC), whereby additional stations, which are not programmed to respond to the transmitted GIC, are enabled to join the call, the method comprising the following steps:

(a) selecting a Group Call Access Permission (GCAP) value, according to receiving stations a call initiator wishes to reach, and a Help Request Level (HRL) value, according to a priority assigned to the call, (b) transmitting a setup message including the group identification code and at least a first additional field carrying said Group Call Access Permission (GCAP) value and a second additional field carrying said Help Request Level (HRL) value, and (c) receiving from a transmitting station a group call setup message having GCAP and HRL fields and allowing the receiving station to join the call, on the basis of the values of the GCAP and the HRL fields.

19. A computer program product comprising a computer useable medium having computer readable program code embodied therein for setting up a group call within a dispatch radio communication system, using a broadcast setup message that includes a group identification code (GIC), whereby additional stations, which are not programmed to respond to the transmitted GIC, are enabled to join the call, the computer program product comprising:

computer readable program code for causing the computer to select a Group Call Access Permission (GCAP) value, according to receiving stations the call initiator wishes to reach, and a Help Request Level (HRL) value, according to a priority assigned to the call, computer readable program code for causing the computer to transmit a setup message including the group identification code and at least a first additional field carrying said Group Call Access Permission (GCAP) value and a second additional field carrying said Help Request Level (HRL) value, and computer readable program code for causing the computer to receive from a transmitting station a group call setup message having GCAP and HRL fields and allowing the receiving station to join the call, on the basis of the values of the GCAP and the HRL fields.

* * * * *